(12) United States Patent
Hinata

(10) Patent No.: US 11,552,528 B2
(45) Date of Patent: Jan. 10, 2023

(54) ACTUATOR AND DAMPER UNIT

(71) Applicant: NIDEC SANKYO CORPORATION, Nagano (JP)

(72) Inventor: Shoji Hinata, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 143 days.

(21) Appl. No.: 17/210,538

(22) Filed: Mar. 24, 2021

(65) Prior Publication Data
US 2021/0305878 A1 Sep. 30, 2021

(30) Foreign Application Priority Data

Mar. 31, 2020 (JP) .............................. JP2020-062078

(51) Int. Cl.
*H02K 33/18* (2006.01)
*H02K 5/24* (2006.01)

(52) U.S. Cl.
CPC ............... *H02K 5/24* (2013.01); *H02K 33/18* (2013.01)

(58) Field of Classification Search
CPC ...... H02K 35/00; H02K 35/02; H02K 11/046; H02K 7/1869; H02K 7/1876; H02K 41/02; H02K 33/00; H02K 33/02; H02K 33/04; H02K 33/06; H02K 33/18; H02K 33/16; H02K 5/24; H02K 15/00; H02J 1/00; H02N 11/00; H02N 11/002; H02N 11/04
USPC ... 310/29, 12, 4, 12.12, 12.01, 12.03, 12.13, 310/12.16, 12.26, 25, 15; 335/229; 290/4
See application file for complete search history.

(56) References Cited

U.S. PATENT DOCUMENTS

| | | | |
|---|---|---|---|
| 10,411,575 B2* | 9/2019 | Takeda | H01F 7/088 |
| 11,070,120 B2* | 7/2021 | Kitahara | H02K 33/06 |
| 2010/0060774 A1* | 3/2010 | Azuma | G03B 3/10 |
| | | | 348/335 |
| 2014/0054984 A1* | 2/2014 | Tang | H02K 33/18 |
| | | | 310/28 |
| 2017/0110952 A1* | 4/2017 | Takeda | H02K 33/02 |
| 2019/0070635 A1* | 3/2019 | Takeda | H02K 33/18 |
| 2019/0190365 A1* | 6/2019 | Takeda | B06B 1/04 |
| 2019/0267881 A1* | 8/2019 | Matsuyama | H02K 33/18 |
| 2019/0305660 A1* | 10/2019 | Tsuchihashi | H02K 33/16 |
| 2019/0326803 A1* | 10/2019 | Hasegawa | H02K 33/18 |
| 2020/0059145 A1* | 2/2020 | Kitahara | H02K 33/10 |
| 2020/0059147 A1* | 2/2020 | Kitahara | H02K 33/16 |

(Continued)

FOREIGN PATENT DOCUMENTS

JP 2019013086 1/2019

*Primary Examiner* — Maged M Almawri
(74) *Attorney, Agent, or Firm* — JCIPRNET

(57) ABSTRACT

An actuator includes a first damper member and a second damper member that couple a movable body and an immovable body and each include a gel member in a tubular form. The gel member has a first end face and a second end face that are different from each other in cross-sectional shape. The first damper member and the second damper member are oppositely oriented in the axial direction, and are opposite from each other in position of the first end face and the second end face. Consequently, the characteristic variance due to the difference in the direction, in which the movable body moves, is reduced or removed in the actuator as a whole, even if each single damper member is involved with such characteristic variance.

9 Claims, 6 Drawing Sheets

(56) References Cited

U.S. PATENT DOCUMENTS

2020/0099272 A1* 3/2020 Taguchi .................. F16F 15/08
2020/0161955 A1   5/2020 Kitahara et al.
2020/0204054 A1* 6/2020 Mori ....................... H02K 5/24

* cited by examiner

ACTUATOR AND DAMPER UNIT

CROSS REFERENCE TO RELATED APPLICATION

The present application claims priority under 35 U.S.C. § 119 to Japanese Application No. 2020-062078, filed on Mar. 31, 2020, and the entire content of which is incorporated herein by reference.

BACKGROUND

Field of the Invention

At least an embodiment of the present invention relates to an actuator that oscillates a movable body with respect to an immovable body, and to a damper unit that couples a movable body and an immovable body.

Description of the Related Documents

On a conventional actuator, an immovable body, a movable body, and a magnetic drive mechanism that oscillates the movable body with respect to the immovable body are provided, and the movable body and the immovable body are coupled together by a damper member. In Japanese Unexamined Patent Application Publication No. 2019-13086, a movable body includes a yoke with a magnet fixed thereto, and an immovable body (support) includes a cover for housing the movable body, and a holder for holding a coil. Of a damper member (gel damper member), one face in the thickness direction is bonded to the yoke and the other face to a covering member.

In Japanese Unexamined Patent Application Publication No. 2019-13086, the damper member is a gel member (gel damper member) that is a sheet-like gel rectangularly cut, and is placed between the yoke and the cover. In Japanese Unexamined Patent Application Publication No. 2019-13086, the cut gel member is to be handled alone as a part, and such handling is not easy. In addition, in the structure as disclosed in Japanese Unexamined Patent Application Publication No. 2019-13086, the gel member is so assembled as to be also deformable in a direction orthogonal to the direction of oscillation. Consequently, the movable body is liable to move in an unintended direction.

The present inventors propose a damper member having the structure, in which a tubular gel member is arranged in a space between a first member and a second member each in a frame form (inner frame and outer frame), and the first member and the second member are coupled together by the tubular gel member. In an actuator having the structure, in which the first member (inner frame) is fixed to a shaft as a part on the movable body side and the second member (outer frame) is fixed to a case as a part on the immovable body side, a movable body hardly moves in a direction orthogonal to the direction of oscillation (axial direction).

Examples of the method for fabricating a damper member having the structure as above include a method (casting), in which a gel material is filled between the first member and the second member and solidified. If the damper member is fabricated by casting, however, the gel member has one end face formed flat by a die, while the other end face is made concave by the surface tension. The end faces on one side and the other side in the direction of oscillation of the gel member are thus different from each other in cross-sectional shape, so that it is not possible to make the characteristics of the gel member when the movable body moves to one side in the direction of oscillation the same as the characteristics when the movable body moves to the other side. Consequently, the characteristics of the actuator when the movable body moves to one side in the direction of oscillation are different from the characteristics when the movable body moves to the other side.

In view of such problems, an object of at least an embodiment of the present invention is to reduce or remove the characteristic variance of a damper member between the cases, where a movable body moves to one side in the direction of oscillation and where the movable body moves to the other side, in an actuator and a damper unit each including the damper member, which is constructed such that a first member and a second member each in a frame form are coupled together by a tubular gel member.

SUMMARY

In order to solve the above problems, an actuator according to at least an embodiment of the present invention includes a movable body and an immovable body, a drive mechanism configured to oscillate the movable body with respect to the immovable body, and a first damper member and a second damper member configured to couple the movable body and the immovable body. The first damper member and the second damper member each include a gel member in a tubular form, a first member coupled to an inner periphery of the gel member, and a second member surrounding an outer peripheral side of the first member and coupled to an outer periphery of the gel member. One of the first member and the second member is coupled to the movable body, and the other of the first member and the second member is coupled to the immovable body. In each of the first damper member and the second damper member, an axial direction of the gel member agrees with a direction of oscillation of the movable body. The gel member has a first end face and a second end face facing in a direction opposite to the first end face, with the first end face and the second end face differing from each other in cross-sectional shape. In the first damper member, the first end face is directed to one side in the direction of oscillation and the second end face is directed to another side in the direction of oscillation. In the second damper member, the second end face is directed to one side in the direction of oscillation and the first end face is directed to another side in the direction of oscillation.

According to at least an embodiment of the present invention, the first damper member and the second damper member, which couple the movable body and the immovable body, each include the gel member in a tubular form, and are each assembled such that the gel member is subjected to the shearing deformation in the axial direction when the movable body is oscillated. In each of the first damper member and the second damper member, an end face (first end face) on one side in the axial direction and an end face (second end face) on the other side in the axial direction of the gel member are different from each other in cross-sectional shape, and the first damper member and the second damper member are so arranged as to be opposite from each other in position of the first end face and the second end face. The characteristic variance of each damper member depending on the moving direction of the movable body is cancelled out by oppositely orienting the two damper members. Consequently, the characteristic variance due to the difference in the direction, in which the movable body moves, is reduced or removed in the actuator as a whole, even if each single damper member is involved with the characteristic variance depending on the moving direction of the movable body.

In at least an embodiment of the present invention, it is preferable that the first damper member couples the movable body and the immovable body at one end side in the direction of oscillation of the movable body and the second damper member couples the movable body and the immovable body at the other end side in the direction of oscillation of the movable body. With such configuration, the movable body is supported at both ends in the direction of oscillation by the damper members each including the gel member. It is thus possible to stably support the movable body and restrain the movable body from moving in an unintended direction.

A damper unit according to at least an embodiment of the present invention includes a first damper member and a second damper member. The first damper member and the second damper member each include a gel member in a tubular form, a first member coupled to an inner periphery of the gel member, and a second member surrounding an outer peripheral side of the first member and coupled to an outer periphery of the gel member. The first damper member and the second damper member are aligned in an axial direction of the gel member. The gel member has a first end face and a second end face opposite with the first end face, with the first end face and the second end face differing from each other in cross-sectional shape. In the first damper member, the first end face is directed to one side in the axial direction and the second end face is directed to another side in the axial direction. In the second damper member, the second end face is directed to one side in the axial direction and the first end face is directed to another side in the axial direction.

At least an embodiment of the present invention has the structure, in which the two damper members (the first damper member and the second damper member) are so combined as to be oppositely oriented, so that the characteristic variance of each damper member due to the difference in direction of relative movement of the first member and the second member is cancelled out. Consequently, the characteristic variance is reduced or removed in the damper unit as a whole, even if each single damper member is involved with the characteristic variance due to the difference in direction of relative movement of the first member and the second member.

In at least an embodiment of the present invention, one of the first end face and the second end face is a flat surface, and the other of the first end face and the second end face, is a concave surface. Such end face shapes are obtained if the first damper member and the second damper member are fabricated by casting. Casting facilitates the fabrication of the first damper member and the second damper member.

In at least an embodiment of the present invention, it is preferable that an end portion on a side of the second end face of the first member protrudes more than an end portion on the side of the second end face of the second member. With such configuration, one glance is enough to find the side, on which end portions of the first member and the second member in each of the damper members (the first damper member and the second damper member) are not equal in position. The front side and the back side of each damper member are thus distinguished from each other on sight, and the same applies to the front side and the back side of the gel member. Therefore, when an actuator is to be assembled, the assembly of damper members of the same configuration that are reversed with respect to the front side and the back side is easily and surely carried out.

In at least an embodiment of the present invention, the gel member is preferably of a cylindrical shape. With the gel member as such, the spring constant is increased upon movement of the movable body in a direction (radial direction) different from the direction of oscillation when the movable body as coupled with one of the first member and the second member is oscillated in the axial direction. It is thus possible to restrain the movable body from moving in a direction different from the direction of oscillation. In addition, the gel member is uniformly arranged over the entire circumference. As a result, the spring constant of the gel member is made uniform over the entire circumference, so that the movable body is not liable to move in a certain direction when the movable body is oscillated in the axial direction. Therefore, the movable body is stably supported.

According to at least an embodiment of the present invention, the two damper members (the first damper member and the second damper member) are so combined as to be oppositely oriented, so that the characteristic variance of each damper member due to the difference in direction of relative movement of the first member and the second member (that is to say, the direction, in which the movable body moves) is cancelled out. Consequently, the characteristic variance of the damper members is reduced or removed as a whole, even if each single damper member is involved with the characteristic variance due to the difference in direction of relative movement of the first member and the second member (that is to say, the direction, in which the movable body moves).

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
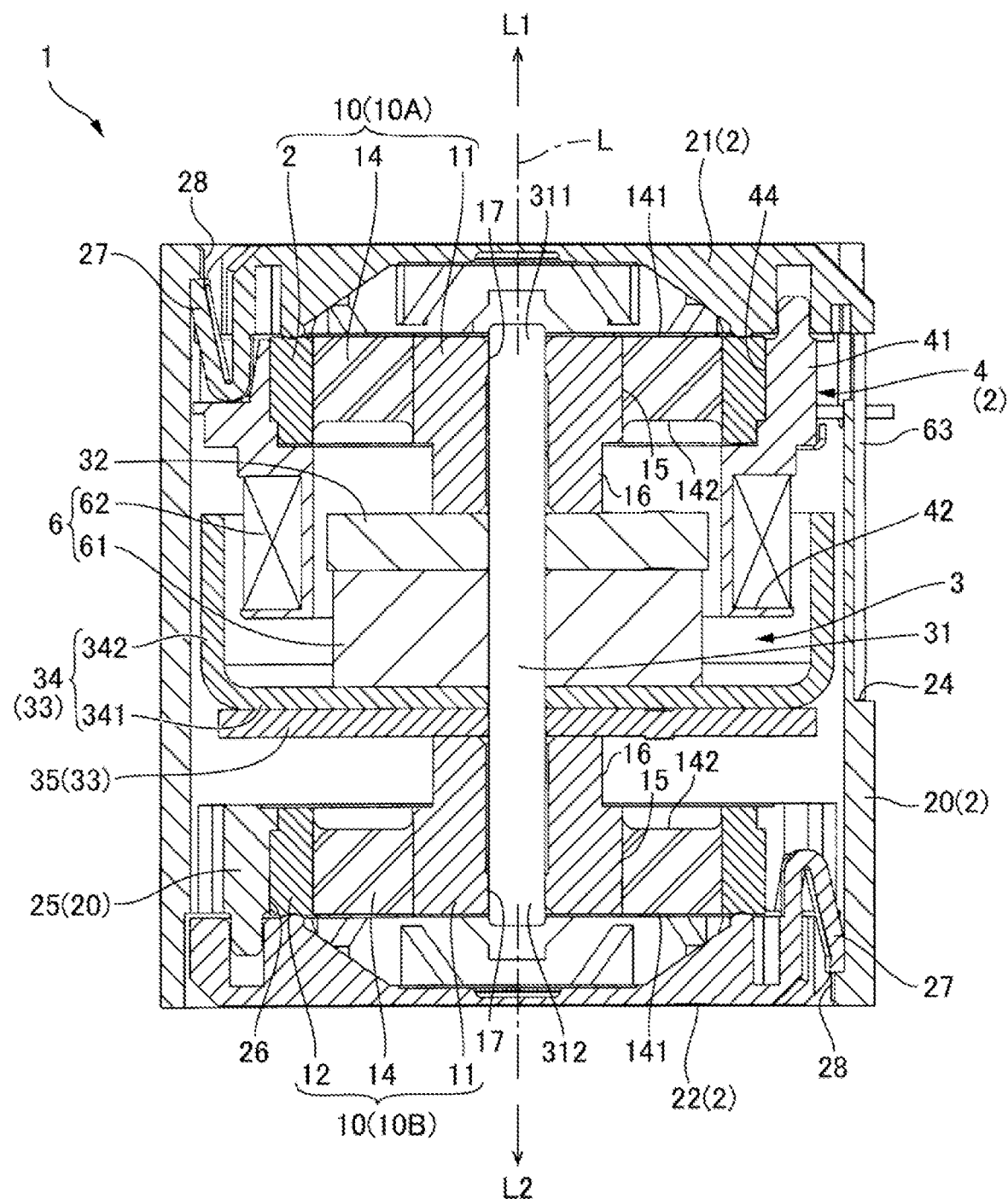
FIG. 1 is a cross-sectional view of an actuator according to an embodiment of the present invention.

In the following, description is made on embodiments of the present invention with reference to the accompanying drawings. In the description below, an axis L refers to the center axis of a movable body 3. One side in the direction, in which the axis L extends, (axis L direction) is denoted by L1, and the other side in the axis L direction by L2. In an actuator 1 according to an embodiment of the present invention, the movable body 3 is oscillated in the axis L direction with respect to an immovable body 2.

In the embodiment as described below, the movable body 3 is arranged on an inner peripheral side of the immovable body 2, while the movable body 3 may be arranged on an outer peripheral side of the immovable body 2 in at least an embodiment of the present invention. In the embodiment as described below, a magnetic drive mechanism 6 that oscillates the movable body 3 with respect to the immovable body 2 includes a magnet 61 arranged on the movable body 3 and a coil 62 arranged on the immovable body 2, while the magnet 61 and the coil 62 may conversely be arranged in at least an embodiment of the present invention. In other words, the magnetic drive mechanism 6 may include the coil 62 arranged on the movable body 3 and the magnet 61 arranged on the immovable body 2.

Figure 2:
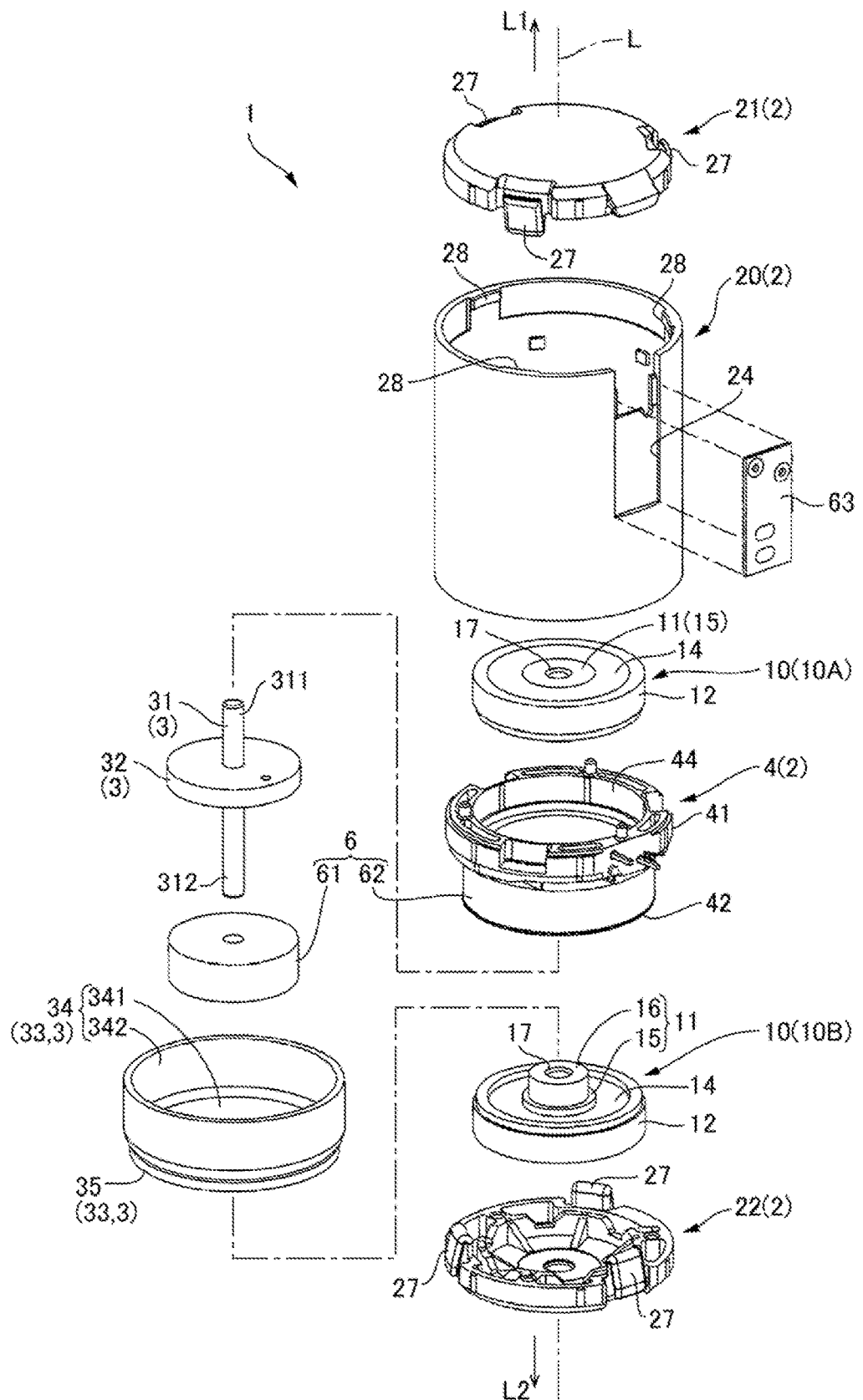
FIG. 2 is an exploded perspective view of the actuator of FIG. 1 as viewed from one side in an axial direction.
Figure 3:
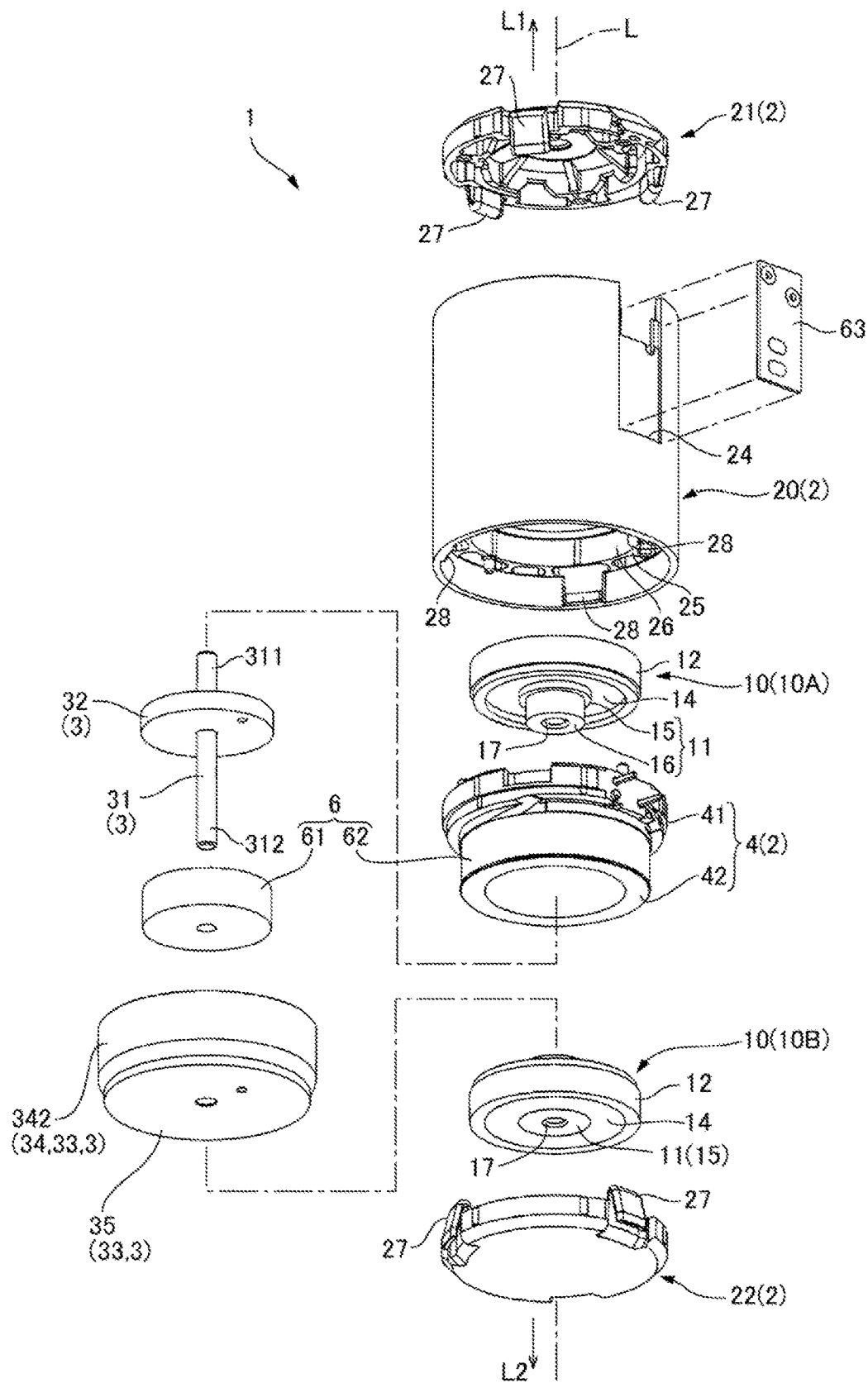
FIG. 3 is an exploded perspective view of the actuator of FIG. 1 as viewed from the other side in the axial direction.

General Configuration FIG. 1 is a cross-sectional view of the actuator 1 according to an embodiment of the present invention. FIG. 2 is an exploded perspective view of the actuator 1 illustrated in FIG. 1 as viewed from one side L1 in the axis L direction. FIG. 3 is an exploded perspective view of the actuator 1 illustrated in FIG. 1 as viewed from the other side L2 in the axis L direction. The actuator 1 includes the immovable body 2 and the movable body 3, a damper member 10 that couples the immovable body 2 and the movable body 3 together, and the magnetic drive mechanism 6, which causes a relative movement of the movable body 3 with respect to the immovable body 2. The magnetic drive mechanism 6 includes the magnet 61 arranged on the movable body 3 and the coil 62 arranged on the immovable body 2, and causes a relative movement of the movable body 3 with respect to the immovable body 2 in the axis L direction.

Damper Member

The movable body 3 is coupled with the immovable body 2 by the damper member 10 in each of an end portion on one side L1 in the axis L direction and an end portion on the other side L2 in the axis L direction. In the following, the damper member 10, which is arranged on one side L1 in the axis L direction, is referred to as "first damper member 10A" and the damper member 10, which is arranged on the other side L2 in the axis L direction, is referred to as "second damper member 10B".

The damper member 10 includes a first member 11, a second member 12 that surrounds an outer peripheral side of the first member 11, and a gel member 14 arranged between the first member 11 and the second member 12. In the present embodiment, the first member 11 and the second member 12 are each cylindrical, and are arranged in a coaxial manner. The gel member 14 has a cylindrical shape with a constant thickness in the radial direction. The inner periphery of the gel member 14 is coupled to an outer peripheral face of the first member 11, and the outer periphery of the gel member 14 is coupled to an inner peripheral face of the second member 12. The gel member 14 is compactly filled between the first member 11 and the second member 12, and continuously arranged over the entire circumference.

The first member 11 has a large diameter portion 15 and a small diameter portion 16 with a diameter smaller than the diameter of the large diameter portion 15. As illustrated in FIG. 1, a shaft hole 17 is formed in the center of the first member 11, and a shaft 31 of the movable body 3 is arranged in the shaft hole 17. The large diameter portion 15 of the first member 11 is arranged on an inner peripheral side of the second member 12, and the small diameter portion 16 extends from the large diameter portion 15 toward one side L1 or the other side L2 in the axis L direction. The inner periphery of the gel member 14 is coupled to an outer peripheral face of the large diameter portion 15.

The damper member 10 has at least one of elasticity and viscoelasticity. In the present embodiment, the first member 11 and the second member 12 are both metallic, and the gel member 14 is a viscoelastic object. The gel member 14 is made of, for instance, a silicone gel with a penetration of 90 to 110 degrees. The first member 11 and the second member 12 are not limited to metallic members but may be formed of another material.

In the present embodiment, the first member 11 is fixed to the movable body 3. The first member 11 is oscillated in the axis L direction integrally with the movable body 3. Therefore, the first member 11 can be used as a weight for controlling the mass of the movable body 3. The second member 12 is fixed to the immovable body 2. The gel member 14 couples the immovable body 2 and the movable body 3 together through the first member 11 and the second member 12. When the movable body 3 is oscillated in the axis L direction, the gel member 14 is deformed in the shearing direction.

The first damper member 10A and the second damper member 10B are the same members, and are oppositely oriented in the axis L direction. In the first damper member 10A, the small diameter portion 16 extends from the large diameter portion 15 toward the other side L2 in the axis L direction and, in the second damper member 10B, the small diameter portion 16 extends from the large diameter portion 15 toward one side L1 in the axis L direction.

The gel member 14 has a first end face 141 directed in the axis L direction, and a second end face 142 opposite with the first end face 141. As illustrated in FIG. 1, the first end face 141 and the second end face 142 are different from each other in cross-sectional shape obtained by the cutting along a plane including the axis L. In the first damper member 10A, the first end face 141 is directed to one side L1 in the axis L direction and the second end face 142 is directed to the other side L2 in the axis L direction. In the second damper member 10B, the first end face 141 is directed to the other side L2 in the axis L direction and the second end face 142 is directed to one side L1 in the axis L direction.

As described later, the damper member 10 is fabricated by the method (casting), in which a gel material G (see FIG. 4) is filled between the first member 11 and the second member 12 and solidified. The first end face 141 of the gel member 14 is a face in contact with a die member for fabrication, so that the first end face 141 is located in the plane, where an end face of the large diameter portion 15 of the first member 11 and an end face of the second member 12 are located, and is a flat surface. On the other hand, the second end face 142 of the gel member 14 is constituted of a surface (liquid surface) of the filled gel material G, so that the second end face 142 is made concave by the surface tension.

Immovable Body

The immovable body 2 includes a case 20 in a tubular form, a first cap member 21 that closes an opening on one side L1 in the axis L direction of the case 20, a second cap member 22 that closes an opening on the other side L2 in the axis L direction of the case 20, and a coil holder 4 arranged between the first cap member 21 and the second cap member 22 inside the case 20. In the present embodiment, the case 20, the first cap member 21, the second cap member 22, and the coil holder 4 are all made of a resin.

As illustrated in FIGS. 2 and 3, the first cap member 21 and the second cap member 22 are each provided with a claw 27 at three places. The claw 27 is elastically deformable inward in the radial direction, and is pressed into an inner peripheral side of the case 20. The tip of the claw 27 is locked by a locking part 28 provided on an edge of the case 20, which checks the separation of the first cap member 21 and the second cap member 22 from the case 20.

The coil holder 4 includes a holder annular portion 41 and a drum 42 protruding from the holder annular portion 41 toward the other side L2 in the axis L direction. The coil holder 4 is fixed to the case 20 by press fitting the holder annular portion 41 into the case 20. To the holder annular portion 41, the first cap member 21 is fixed from the side L1. The holder annular portion 41 has an opening section 44 in a circular shape, and the first damper member 10A is fixed to the opening section 44. In the present embodiment, the second member 12 of the first damper member 10A is press fit into the opening section 44.

To the drum 42 of the coil holder 4, the coil 62 is fixed. An end of a coil wire (not illustrated) drawn out from the coil 62 is fastened to a terminal pin protruding from the holder annular portion 41 outward in the radial direction. The coil wire is connected to a circuit board 63 through the terminal pin. As illustrated in FIG. 2, the circuit board 63 is fixed to a recess 24 provided in an outer peripheral face of the case 20.

As illustrated in FIG. 1, the case 20 includes a case annular portion 25 protruding from the position on the side L1 of the second cap member 22 toward an inner peripheral side. The second cap member 22 is fixed to the case annular portion 25 from the side L2. The case annular portion 25 has an opening section 26 in a circular shape, and the second damper member 10B is fixed to the opening section 26. In the present embodiment, the second member 12 of the second damper member 10B is press fit into the opening section 26.

Movable Body

The movable body 3 includes the shaft 31, which extends in the axis L direction in the center in the radial direction of the immovable body 2, the magnet 61, which is fixed approximately at the center in the axis L direction of the shaft 31, a first yoke 32 overlapping the magnet 61 on the side L1, and a second yoke 33 overlapping the magnet 61 on the side L2.

The magnet 61 is cylindrical, and is so magnetized as to polarize into an N pole and an S pole in the axis L direction. The shaft 31 extends in the axis L direction in the center in the radial direction of the immovable body 2. On an outer peripheral side of the magnet 61, the drum 42 of the coil holder 4 is arranged coaxially with the magnet 61. Consequently, the magnet 61 and the coil 62 are coaxially arranged.

The first yoke 32 is a magnetic plate with an outer diameter slightly larger than the outer diameter of the magnet 61. An outer peripheral face of the first yoke 32 overhangs outward in the radial direction more than an outer peripheral face of the magnet 61. The first yoke 32 is fixed to a face on the side L1 of the magnet 61 by such a method as bonding.

The second yoke 33 is composed of two magnetic plates (a first magnetic plate 34 and a second magnetic plate 35). The first magnetic plate 34 has an end plate section 341 that is fixed to a face on the side L2 of the magnet 61 by such a method as bonding, and a side plate section 342 in a cylindrical shape that extends from an outer edge of the end plate section 341 toward the side L1. The side plate section 342 is arranged on an outer peripheral side of the drum 42 of the coil holder 4. The second magnetic plate 35 is in the form of a disk that is slightly smaller than the end plate section 341 of the first magnetic plate 34. On the second magnetic plate 35, the end plate section 341 of the first magnetic plate 34 is layered on the side L1, and the second magnetic plate 35 is welded to the end plate section 341. The end plate section 341 is fixed to the face on the side L2 of the magnet 61 by such a method as bonding.

The shaft 31 has a first end portion 311 protruding from the first yoke 32 toward the side L1, and a second end portion 312 protruding from the second yoke 33 toward the side L2. To the first end portion 311, the first member 11 of the first damper member 10A is fixed. To the second end portion 312, the first member 11 of the second damper member 10B is fixed. The two first members 11 fixed to both ends of the shaft 31 move integrally with the movable body 3.

Fabrication Method for Damper Member

Figure 4:
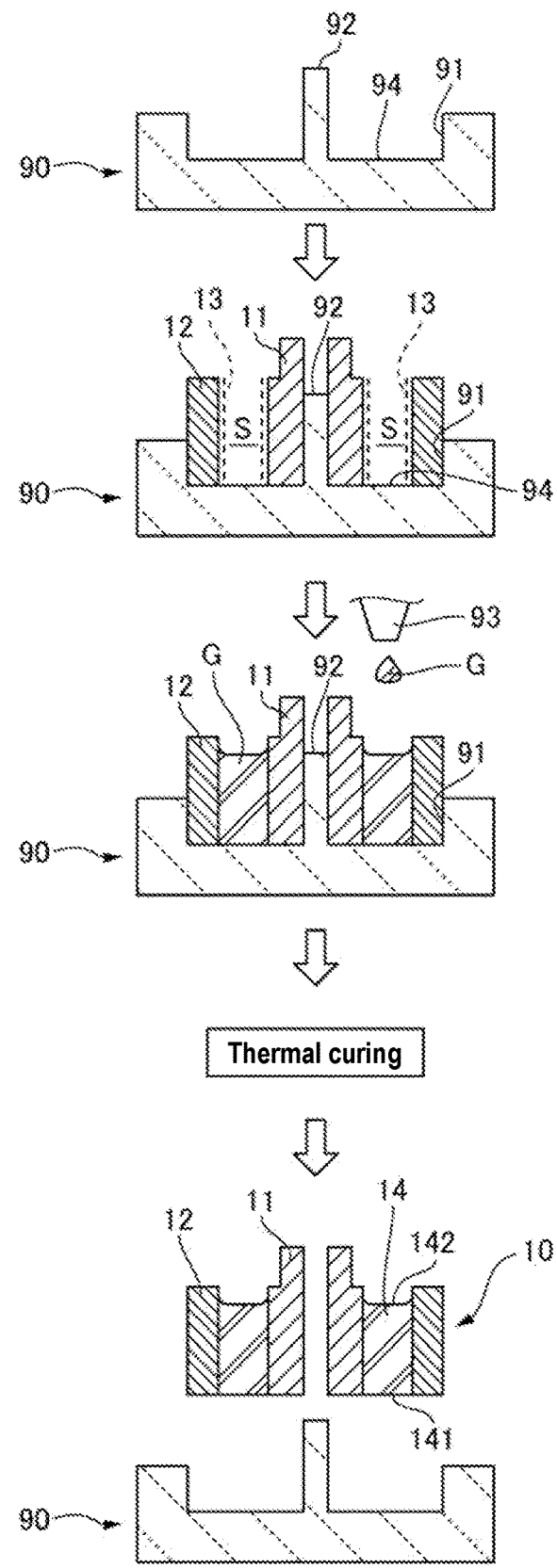
FIG. 4 is a diagram illustrating a method of fabricating a damper member.

FIG. 4 is a diagram illustrating a method of fabricating the damper member 10. A fabrication jig 90 for use in the fabrication of the damper member 10 includes a circular recess 91 and a pin 92 protruding from the center of a bottom face of the circular recess 91. A method of fabricating the damper member 10 includes a first step of setting the first member 11 and the second member 12 on the fabrication jig 90, a second step of filling the gel material G in a space S between the first member 11 and the second member 12, a third step of subjecting the gel material G to thermal curing, and a fourth step of detaching the damper member 10 from the fabrication jig 90.

In the first step, the first member 11 and the second member 12 are made to abut on the fabrication jig 90 and positioned so as to form the space S in the radial direction between the first member 11 and the second member 12. As illustrated in FIG. 4, in the first step, the pin 92 protruding from the center of the circular recess 91 is inserted into the shaft hole 17 of the first member 11, and an end face of the large diameter portion 15 of the first member 11 is made to abut on a bottom face 94 of the circular recess 91 from the side L1. In addition, the second member 12 is brought into contact with an inner peripheral face of the circular recess 91, and an end face of the second member 12 is made to abut on an outer peripheral region of the bottom face 94 of the circular recess 91. Thus, the first member 11 and the second member 12 are positioned in the axis L direction and the radial direction, and the space S in an annular shape is formed between the large diameter portion 15 of the first member 11 and the second member 12. The space S in an annular shape is formed over the entire circumference and has the width in the radial direction, which is constant over the entire circumference.

In the present embodiment, before putting the gel material G into the space S in the second step, a primer 13 is applied to a face coming into contact with the gel member 14. Specifically, the primer 13 is applied to the outer peripheral face of the large diameter portion 15 of the first member 11 and the inner peripheral face of the second member 12. The application of the primer 13 may be performed before or after the setting of the first member 11 and the second member 12 on the fabrication jig 90.

In the second step, the space S between the first member 11 and the second member 12 is filled with the gel material G before curing. As illustrated in FIG. 4, in the second step, the gel material G is discharged from a dispenser 93 so as to fill up the space S. The surface (liquid surface) of the gel material G has a shape rolled up at an outer peripheral edge by the effect of the surface tension and, accordingly, is concave as a whole.

In the third step, the gel material G is kept heated along with the fabrication jig 90 at a specified temperature for a specified time so as to cure the gel material G. The gel member 14 is thus formed in the space S. During such thermal curing, portions of the gel material G that are in contact with the primer 13 react with the primer 13, and are thereby fixed to the outer peripheral face of the first member 11 and the inner peripheral face of the second member 12. Therefore, the gel member 14 after curing is fixed to the first member 11 and the second member 12 using no bonding agents but owing to the bonding capacity of the gel member 14 in itself.

In the fourth step, the damper member 10 as completed is detached from the fabrication jig 90. As an example, a through hole (not illustrated) for arranging an ejector pin is formed in the faces of the fabrication jig 90, on which faces the first member 11 and the second member 12 abut, and the damper member 10 is detached from the fabrication jig 90 with the ejector pin. In the damper member 10 as completed, the first end face 141, which was in contact with the bottom face 94 of the circular recess 91, is a flat surface, while the second end face 142, which was the liquid surface, is a concave surface. The small diameter portion 16 of the first member 11 (that is to say, the end portion on the second end face 142 side of the first member 11) protrudes more than the end portion on the second end face 142 side of the second member 12.

Operation of Actuator

In the actuator 1, electricity is conducted to the coil 62 so as to cause the magnetic drive mechanism 6 to generate a driving force for driving the movable body 3 in the axis L direction. If the electricity conducted to the coil 62 is turned off, the movable body 3 is returned to the original position by a restoring force of the gel member 14. Consequently, the movable body 3 is oscillated in the axis L direction by intermittently conducting electricity to the coil 62.

When the movable body 3 is oscillated in the axis L direction with respect to the immovable body 2, the first member 11 as fixed to the inner periphery of the gel member 14 and the second member 12 as fixed to the outer periphery of the gel member 14 are relatively moved in the axis L direction in each of the two damper members 10 (the first damper member 10A and the second damper member 10B). Consequently, the gel member 14 is deformed in the shearing direction following the oscillation of the movable body 3.

Chief Effects of Present Embodiment

As described above, in the actuator 1 according to the present embodiment, the first damper member 10A and the second damper member 10B, which couple the movable body 3 and the immovable body 2 together, each include the gel member 14 in a tubular form, and are each assembled such that the gel member 14 is subjected to the shearing deformation in the axial direction when the movable body 3 is oscillated.

In other words, the actuator 1 according to the present embodiment includes the movable body 3 and the immovable body 2, the magnetic drive mechanism 6, which oscillates the movable body 3 with respect to the immovable body 2, and the first damper member 10A and the second damper member 10B, which couple the movable body 3 and the immovable body 2 together. The first damper member 10A and the second damper member 10B each include the gel member 14 in a tubular form, the first member 11 coupled to the inner periphery of the gel member 14, and the second member 12 surrounding the outer peripheral side of the first member 11 and coupled to the outer periphery of the gel member 14. Of the first member 11 and the second member 12, one is coupled to the movable body 3 and the other to the immovable body 2. In each of the first damper member 10A and the second damper member 10B, the axial direction of the gel member 14 agrees with the direction of oscillation (axis L direction) of the movable body 3.

In the present embodiment, the first damper member 10A and the second damper member 10B, which couple the movable body 3 and the immovable body 2 together, are oppositely oriented in the axis L direction, and are so arranged as to be opposite from each other in position of the first end face 141 and the second end face 142, which are different from each other in cross-sectional shape.

In other words, in the present embodiment, the gel member 14 has the first end face 141 directed in the axial direction and the second end face 142 opposite with the first end face 141, and the first end face 141 and the second end face 142 are different from each other in cross-sectional shape. In the first damper member 10A, the first end face 141 of the gel member 14 is directed to one side L1 in the direction of oscillation (axis L direction), and the second end face 142 of the gel member 14 is directed to the other side L2 in the direction of oscillation (axis L direction). In contrast, in the second damper member 10B, the second end face 142 of the gel member 14 is directed to one side L1 in the direction of oscillation (axis L direction), and the first end face 141 of the gel member 14 is directed to the other side L2 in the direction of oscillation (axis L direction).

If the two damper members 10 are oppositely oriented as described above, the characteristic variance of the first damper member 10A and the second damper member 10B between the cases, where the movable body 3 moves to one side L1 in the direction of oscillation (axis L direction) and where the movable body 3 moves to the other side L2, is cancelled out. Consequently, the characteristic variance due to the difference in the direction, in which the movable body 3 moves, is reduced or removed in the actuator 1 as a whole, even if each single damper member is involved with the characteristic variance due to the difference in direction of relative movement of the first member 11 and the second member 12.

In the present embodiment, one of the first end face 141 and the second end face 142 is a flat surface and the other is a concave surface. Such end face shapes are obtained if the first damper member 10A and the second damper member 10B are fabricated by casting. In the present embodiment, a heat-curable gel is used for the gel member 14, so that the time required for the curing is long. Therefore, the casting facilitates the fabrication of the first damper member 10A and the second damper member 10B.

The gel member 14 of the present embodiment is of a cylindrical shape and continuously surrounds the first member 11 over the entire circumference. In each of the two damper members 10 (the first damper member 10A and the second damper member 10B), the gel member 14 is deformed in the direction of crush if the movable body 3 moves in the radial direction. When the gel member 14 is deformed in the direction of crush, the spring constant is about three times as large as the spring constant when the gel member 14 is deformed in the shearing direction. Consequently, the movable body 3 is restrained from moving in a direction different from the direction of oscillation (axis L direction). In addition, the gel member 14, as being of a cylindrical shape, is uniformly arranged over the entire circumference. As a result, the spring constant of the gel member 14 is made uniform over the entire circumference, so that the movable body 3 is not liable to move in a certain direction when the movable body 3 is oscillated in the axial direction. Therefore, the movable body 3 is stably supported.

In the present embodiment, the first damper member 10A couples the movable body 3 and the immovable body 2 together on one end side in the direction of oscillation (axis L direction) of the movable body 3, and the second damper member 10B couples the movable body 3 and the immovable body 2 together on the other end side in the direction of oscillation (axis L direction) of the movable body 3. The movable body 3 is thus supported by the damper members 10, each of which includes the gel member 14, at both ends in the direction of oscillation (axis L direction), that is to say, the movable body 3 is stably supported. Therefore, the movable body 3 is restrained from moving in an unintended direction.

In the damper member 10 of the present embodiment, the end portion on the second end face 142 side (namely, the small diameter portion 16) of the first member 11 protrudes more than the end portion on the second end face 142 side of the second member 12. Consequently, one glance is enough to find the side, on which end portions of the first member 11 and the second member 12 are not equal in position, so that the front side and the back side of the damper member 10 are distinguished from each other on sight, and the same applies to the front side and the back side of the gel member 14. Therefore, when the actuator 1 is to be assembled, the assembly of the damper members 10 of the same configuration, which are reversed with respect to the front side and the back side, is easily and surely carried out.

Modification

Figure 5A:
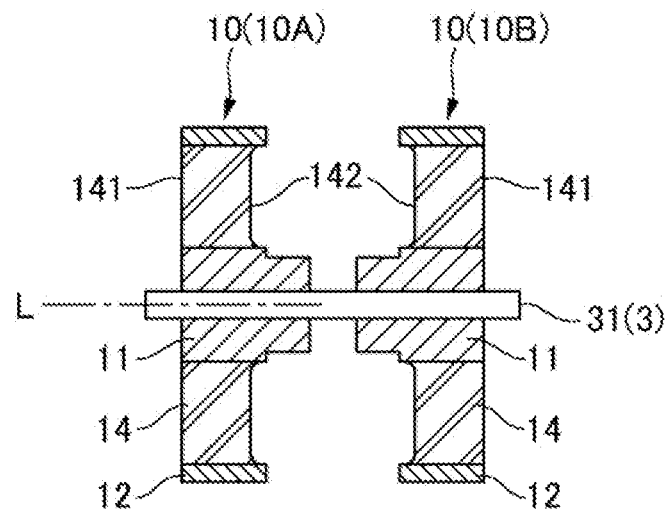
FIGS. 5A and 5B are diagrams illustrating arrangement of a first damper member and a second damper member.
Figure 5B:
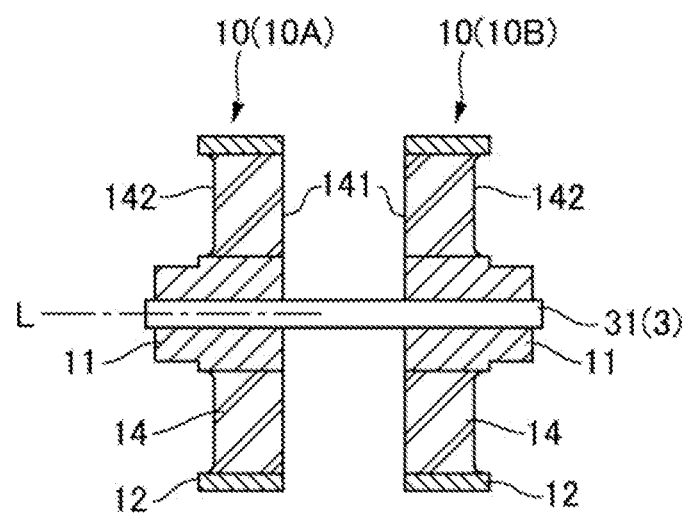

FIGS. 5A and 5B are diagrams illustrating arrangement of the first damper member 10A and the second damper member 10B. FIG. 5A illustrates the arrangement in the embodiment as described above, and FIG. 5B illustrates the arrangement in a modification. In the above embodiment, the first damper member 10A and the second damper member 10B are arranged such that the second end faces 142 of the gel members 14 are opposite to each other as illustrated in FIGS. 1 and 5A, while the damper members 10A and 10B may each be oriented conversely to the above embodiment, as illustrated in FIG. 5B.

In the arrangement illustrated in FIG. 5B, the first damper member 10A and the second damper member 10B are arranged such that the first end faces 141 of the gel members 14 are opposite to each other. Also in such arrangement, the characteristic variance of the first damper member 10A and the second damper member 10B between the cases, where the movable body 3 moves to one side L1 in the direction of oscillation (axis L direction) and where the movable body 3 moves to the other side L2, is cancelled out. Consequently, the characteristic variance due to the difference in the direction, in which the movable body 3 moves, is reduced or removed in the actuator 1 as a whole, even if each single damper member is involved with the characteristic variance due to the difference in direction of relative movement of the first member 11 and the second member 12.

Damper Unit

Figure 6:
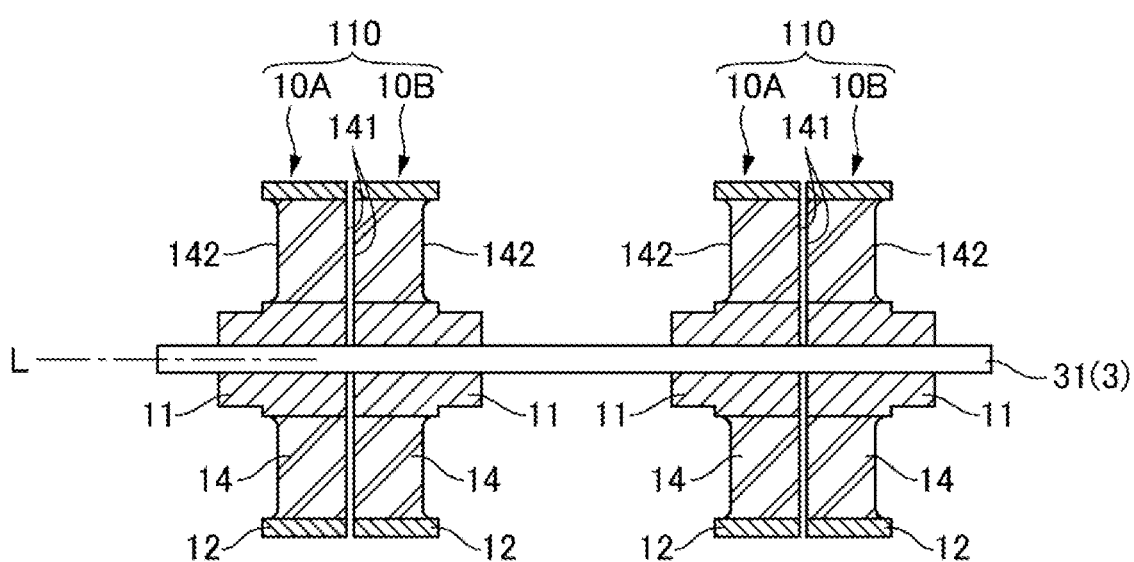
FIG. 6 is a diagram illustrating a damper unit according to an embodiment of the present invention.

FIG. 6 is a diagram illustrating a damper unit 110 according to an embodiment of the present invention. The damper unit 110 illustrated in FIG. 6 includes two damper members 10. The damper members 10 are each identical in configuration to the damper member 10 in the above embodiment, and are oppositely oriented in the axis L direction. Consequently, the damper unit 110 is symmetrical as a whole with respect to a plane perpendicular to the axis L direction.

In other words, the damper unit 110 according to the present embodiment includes the first damper member 10A and the second damper member 10B, and the first damper member 10A and the second damper member 10B each include the gel member 14 in a tubular form, the first member 11 coupled to the inner periphery of the gel member 14, and the second member 12 surrounding the outer peripheral side of the first member 11 and coupled to the outer periphery of the gel member 14. The first damper member 10A and the second damper member 10B are aligned in the axial direction of the gel member 14. The gel member 14 has the first end face 141 and the second end face 142 opposite with the first end face 141, and the first end face 141 and the second end face 142 are different from each other in cross-sectional shape. In the first damper member 10A, the first end face 141 is directed to one side L1 in the axis L direction and the second end face 142 is directed to the other side L2 in the axis L direction. In the second damper member 10B, the second end face 142 is directed to one side L1 in the axis L direction and the first end face 141 is directed to the other side L2 in the axis L direction.

The damper unit 110 has the structure, in which the two damper members 10 (the first damper member 10A and the second damper member 10B) are so combined as to be oppositely oriented, so that the characteristic variance of each damper member 10 due to the difference in direction of relative movement of the first member 11 and the second member 12 is cancelled out. Consequently, the characteristic variance due to the difference in direction of relative movement of the first member 11 and the second member 12 is reduced or removed in the damper unit 110 as a whole.

If the damper unit 110 is used to couple the movable body 3 and the immovable body 2 together, the movable body 3 and the immovable body 2 can be coupled together by the damper unit 110 at two places on one end side and the other end side in the axis L direction of the movable body 3 by coupling the damper unit 110 to each of one end and the other end of the shaft 31 as illustrated in FIG. 6. The damper unit 110 may also be used to couple the movable body 3 and the immovable body 2 together at one place or at three or more places.

What is claimed is:

1. An actuator comprising:
    a movable body and an immovable body;
    a drive mechanism, configured to oscillate the movable body with respect to the immovable body; and
    a first damper member and a second damper member, configured to couple the movable body and the immovable body,
    wherein the first damper member and the second damper member each includes:
        a gel member in a tubular form;
        a first member, coupled to an inner periphery of the gel member; and
        a second member, surrounding an outer peripheral side of the first member and coupled to an outer periphery of the gel member,
    wherein one of the first member and the second member is coupled to the movable body,
    the other of the first member and the second member is coupled to the immovable body,
    in each of the first damper member and the second damper member, an axial direction of the gel member agrees with a direction of oscillation of the movable body,
    the gel member has a first end face and a second end face facing in a direction opposite to the first end face, with the first end face and the second end face differing from each other in cross-sectional shape,
    in the first damper member, the first end face is directed to one side in the direction of oscillation and the second end face is directed to another side in the direction of oscillation, and in the second damper member, the second end face is directed to one side in the direction of oscillation and the first end face is directed to another side in the direction of oscillation.

2. The actuator according to claim 1, wherein one of the first end face and the second end face is a flat surface, and the other of the first end face and the second end face is a concave surface.

3. The actuator according to claim 1, wherein an end portion on a side of the second end face of the first member protrudes more than an end portion on the side of the second end face of the second member.

4. The actuator according to claim 1, wherein the gel member has a cylindrical shape.

5. The actuator according to claim 1, wherein the first damper member couples the movable body and the immovable body at one end side in the direction of oscillation of the movable body, and the second damper member couples the movable body and the immovable body at another end side in the direction of oscillation of the movable body.

6. A damper unit comprising:
a first damper member and a second damper member, wherein the first damper member and the second damper member each includes:
a gel member in a tubular form;
a first member, coupled to an inner periphery of the gel member; and
a second member, surrounding an outer peripheral side of the first member and coupled to an outer periphery of the gel member,
wherein the first damper member and the second damper member are aligned in an axial direction of the gel member,
the gel member has a first end face and a second end face facing in a direction opposite to the first end face, with the first end face and the second end face differing from each other in cross-sectional shape,
in the first damper member, the first end face is directed to one side in the axial direction and the second end face is directed to another side in the axial direction, and
in the second damper member, the second end face is directed to one side in the axial direction and the first end face is directed to another side in the axial direction.

7. The damper unit according to claim 6, wherein one of the first end face and the second end face is a flat surface, and the other of the first end face and the second end face is a concave surface.

8. The damper unit according to claim 6, wherein an end portion on a side of the second end face of the first member protrudes more than an end portion on the side of the second end face of the second member.

9. The damper unit according to claim 6, wherein the gel member has a cylindrical shape.

* * * * *